(12) United States Patent
Lo

(10) Patent No.: US 7,359,209 B2
(45) Date of Patent: Apr. 15, 2008

(54) HINGE WITH A CONNECTOR

(75) Inventor: Chien-Sheng Lo, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 601 days.

(21) Appl. No.: 10/930,843

(22) Filed: Sep. 1, 2004

(65) Prior Publication Data

US 2005/0066478 A1    Mar. 31, 2005

(30) Foreign Application Priority Data

Sep. 16, 2003    (TW) ............................. 92125491 A

(51) Int. Cl.
    *H05K 7/16*    (2006.01)
(52) U.S. Cl. ...................... 361/755; 361/681; 361/679; 16/259; 16/342; 439/31; 439/165
(58) Field of Classification Search ................ 361/681, 361/801, 755, 679, 683, 686; 16/259–261; 439/31, 165
    See application file for complete search history.

(56) References Cited

U.S. PATENT DOCUMENTS

| | | | | |
|---|---|---|---|---|
| 4,140,357 A * | 2/1979 | Wolz et al. .................... 439/31 |
| 5,355,279 A * | 10/1994 | Lee et al. .................... 361/681 |
| 5,363,089 A * | 11/1994 | Goldenberg ................ 340/7.63 |
| 5,796,576 A * | 8/1998 | Kim ............................ 361/681 |
| 5,995,373 A * | 11/1999 | Nagai .......................... 361/755 |
| 6,169,582 B1 * | 1/2001 | Lee ............................. 348/552 |
| 6,449,144 B1 * | 9/2002 | Yeh ............................ 361/681 |
| 6,512,670 B1 * | 1/2003 | Boehme et al. ............. 361/681 |
| 6,515,670 B1 * | 2/2003 | Huang et al. ............... 345/503 |
| 6,530,784 B1 * | 3/2003 | Yim et al. .................... 439/31 |
| 6,728,100 B2 * | 4/2004 | Cheng-Hsing et al. ...... 361/683 |
| 6,778,382 B2 * | 8/2004 | Yim ............................ 361/681 |
| 6,977,810 B2 * | 12/2005 | Song ........................... 361/683 |
| 7,063,042 B2 * | 6/2006 | Dillingham .................. 16/354 |

* cited by examiner

*Primary Examiner*—Jeremy Norris
*Assistant Examiner*—Dameon E Levi
(74) *Attorney, Agent, or Firm*—Birch, Stewart, Kolasch & Birch, LLP

(57) ABSTRACT

An electronic device includes a first body having a first connector and a second body. A hinge located in the electronic device comprises a first hinge piece fastened to the first body, a second hinge piece fastened to the second body and pivotally coupled to the first hinge piece, and a second connector fastened to the fastened to the hinge piece and electrically connecting to the second body and the first connector individually.

15 Claims, 8 Drawing Sheets

HINGE WITH A CONNECTOR

This Non-provisional application claims priority under 35 U.S.C. 119(a) on patent application Ser. No(s). 092125491 filed in Taiwan, Republic of China on Sep. 16, 2003, the entire contents of which are hereby incorporated by reference.

FIELD OF THE INVENTION

The present invention relates to a hinge and particularly to a hinge located in an electronic device having at least two bodies pivotally coupled to each other.

BACKGROUND OF THE INVENTION

For present electronic devices having at least two bodies pivotally coupled to each other, at least a hinge is generally employed for opening and closing. The hinge structure may have different designs and be symmetrical or asymmetrical.

Refer to FIG. 1 for a conventional electronic device 1 that has at least two bodies pivotally coupled to each other. It includes a first body 10, a second body 20 and a hinge 30. The second body 20 may be pivotally coupled to the first body 10 through the hinge 30.

More specifically, the second body 20 has a wire set 21 (including signal cable and power cord) passing around the hinge and through a recess 12 in the first body 10 to couple with a connector 11.

The design of hinge set forth above has drawbacks, notably:
1. During assembly operators have to pull the wire set 21 (including signal cable and power cord) of the second body 20 to the recess 12 to couple with the connector 11. The recess 12 usually has a space constraint that could hinder operators' movements.
2. For maintenance technicians and users who want to do inspection and repairs, the wire set 21 (including signal cable and power cord) has to be separated from or coupled with the connector 11 in the recess 12. It is also not convenient.

SUMMARY OF THE INVENTION

Therefore the invention aims to provide a hinge with a connector to facilitate wire tending, shorten assembly time and speed up assembly and disassembly so that technicians and users can perform repairs and inspection easily, wherein the hinge is located in an electronic device.

The electronic device according to the invention includes a first body a second body and a hinge. The hinge includes a first hinge piece and a second hinge piece that are pivotally coupled to each other. When subject to a force, the second hinge piece turns about a rotation axis relative to the first hinge piece. The first hinge piece further has a first fastening portion and an extension portion. The first fastening portion is a protusion with the axial direction normal to the rotation axis. The first fastening portion has at least a first hole. The extension portion is extended from the first fastening portion to another area in a direction parallel with the rotation axis. The extension portion has at least a sixth hole. The second hinge piece includes a second fastening portion having at least a second hole.

In a preferred embodiment, the first hinge piece further includes a second connector and a connection plate. The connection plate has at least a fifth hole to receive a fifth screw to pass through the fifth hole and the sixth hole to fasten the connection plate to the extension portion. The wire set of the second body (including signal cable and power cord) passes around the hinge and is fastened to the connection plate.

In another preferred embodiment, the first hinge piece further includes a second connector which has at least an eighth hole to receive a sixth screw to engage with the eighth and sixth holes to fasten the second connector to the extension portion. The wire set of the second body (including signal cable and power cord) passes around the hinge and is fastened to the second connector.

The second body has at least a fourth hole to receive at least a second screw to engage with the second and fourth holes to fasten the second hinge piece to the second body.

The first body includes a recess, a third hole and a first connector located in the recess. The recess also houses the extension portion of the first hinge piece and the first fastening portion.

At least one first fixing screw is provided to engage with the first and third holes to fasten the first fastening portion to the recess. Meanwhile, the second connector of the extension portion is coupled with the first connector to transmit communication signals and electric power between the first body and the second body.

By means of the construction set for the above, the hinge enables the first body turning relative to the second body. In addition, through electrical connection between the second connector and the first connector, the first body and the second body may establish electric connection.

For disassembling the electronic device, unfasten at least one first fixing screw, the second body and the hinge may be separated from the first body, and the first connector is separated from the second connector to become non-conductive.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Figure 1:
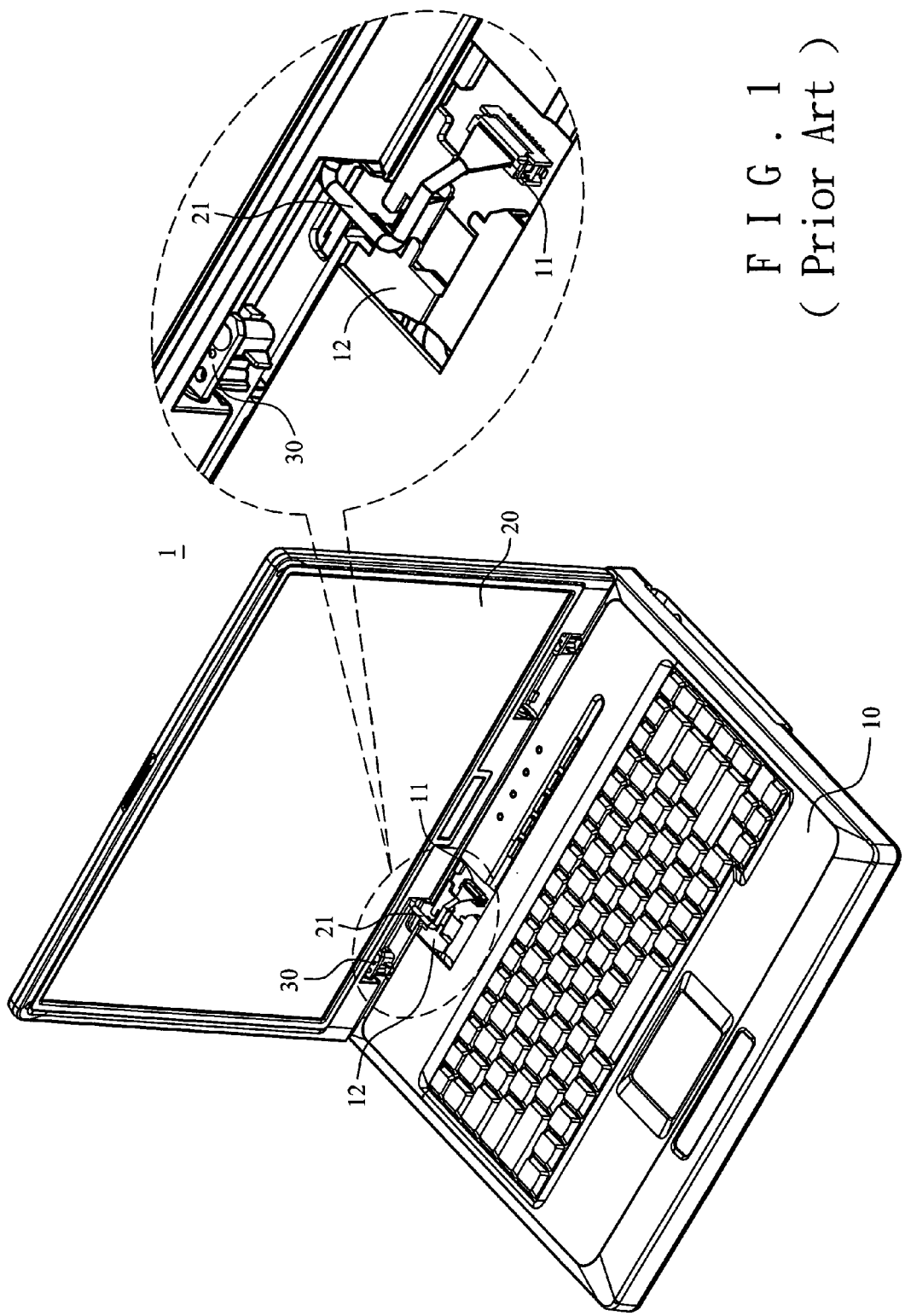
FIG. 1 is a perspective view of a conventional electronic device.
Figure 2:
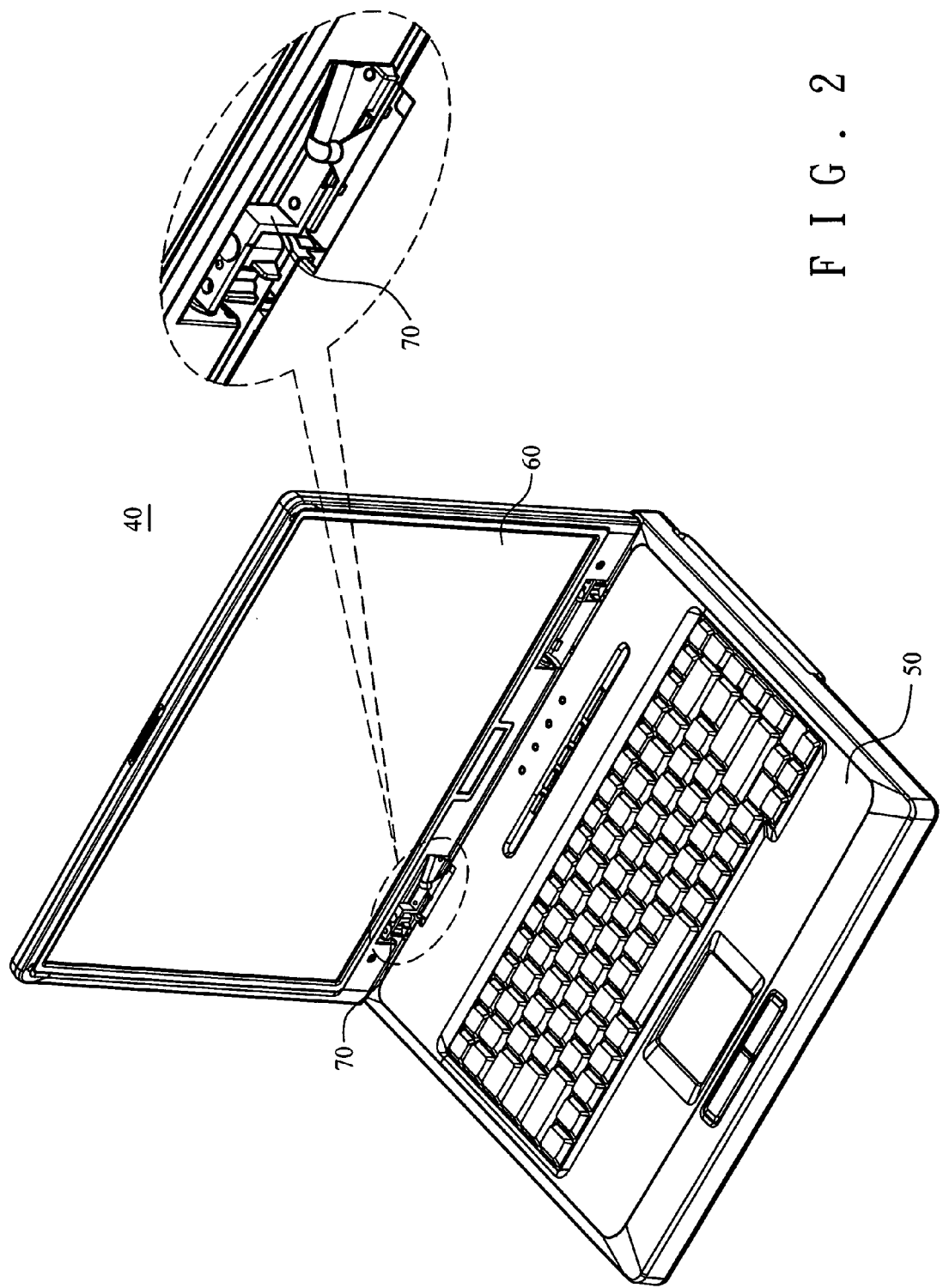
FIG. 2 is a perspective view of an electronic device according to the invention.

Referring to FIG. 2, the electronic device 40 according to the invention includes a first body 50, a second body 60 and a hinge 70.

Figure 3:
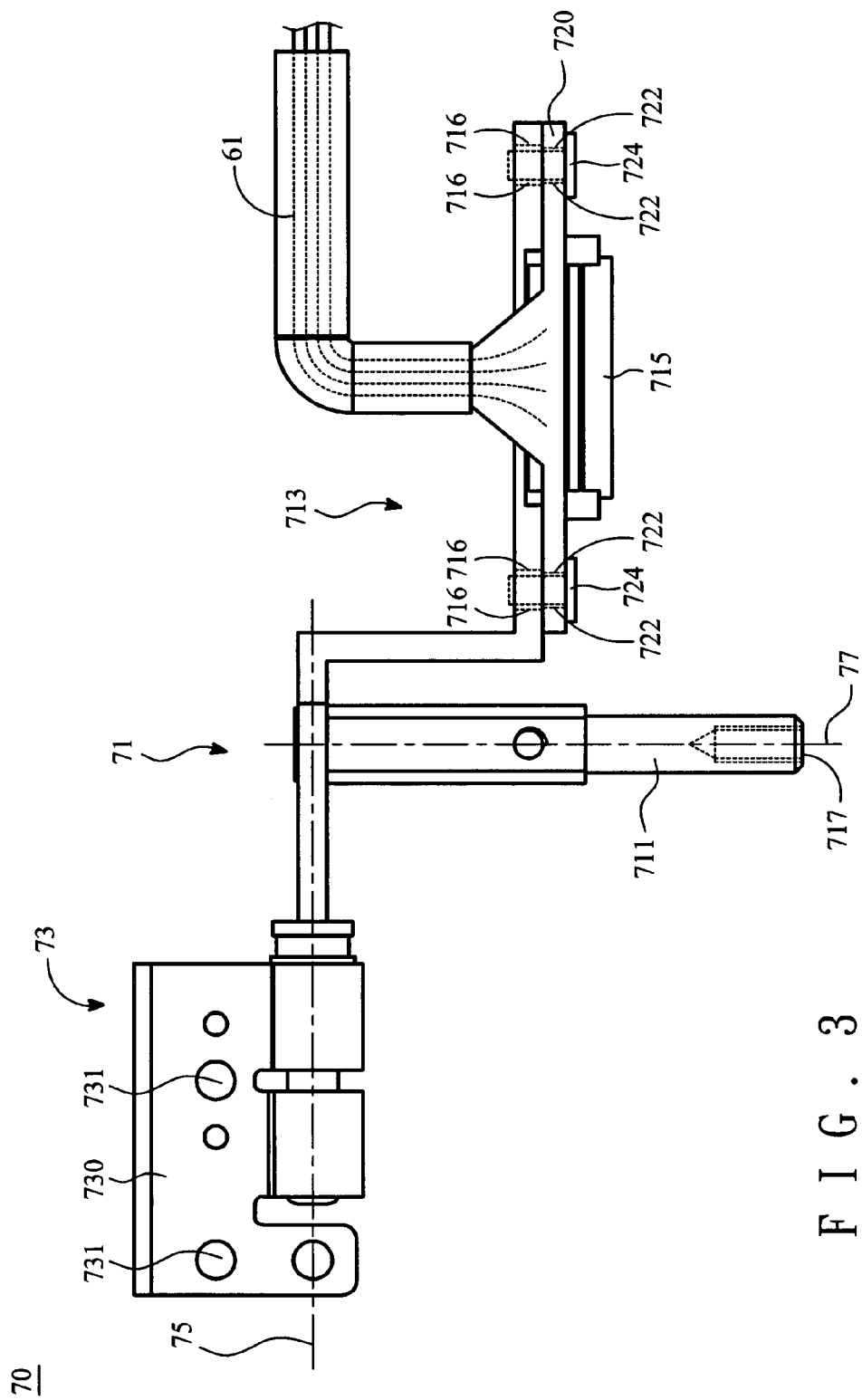
FIG. 3 is a front view of an embodiment of the hinge of the invention.

As shown in FIG. 3, the hinge 70 includes a first hinge piece 71 and a second hinge piece 73 coupling with each other. When subject to a force, the second hinge piece 73 turns about a rotation axis 75 relative to the first hinge piece 71. The first hinge piece 71 further has a first fastening portion 711 and an extension portion 713. The first fastening portion 711 is a protusion with the axial direction 77 normal to the rotation axis 75. The first fastening portion 711 has at least a first hole 717. The protution of the first fastening portion 711 may be designed according the space or designer's preference, and may be a cylindrical body, a square body or a triangular body. In this and another embodiment below the first fastening portion 711 is a square body. The extension portion 713 is extended from the first fastening portion 711 to another area in a direction parallel with the rotation axis 75. The extension portion 713 has at least a sixth hole 716. The second hinge piece 73 includes a second fastening portion 730 having at least a second hole 731.

In a preferred embodiment, the first hinge piece 71 further includes a second connector 715 and a connection plate 720. The connection plate 720 has at least a fifth hole 722 to receive a fifth screw 724 to engage with the sixth hole 716 to fasten the connection plate 720 to the extension portion 713. The second body 60 has a wire set 61 (including signal cable and power cord) passing around the hinge 70 and fastened to the connection plate 720 by soldering.

Figure 4:
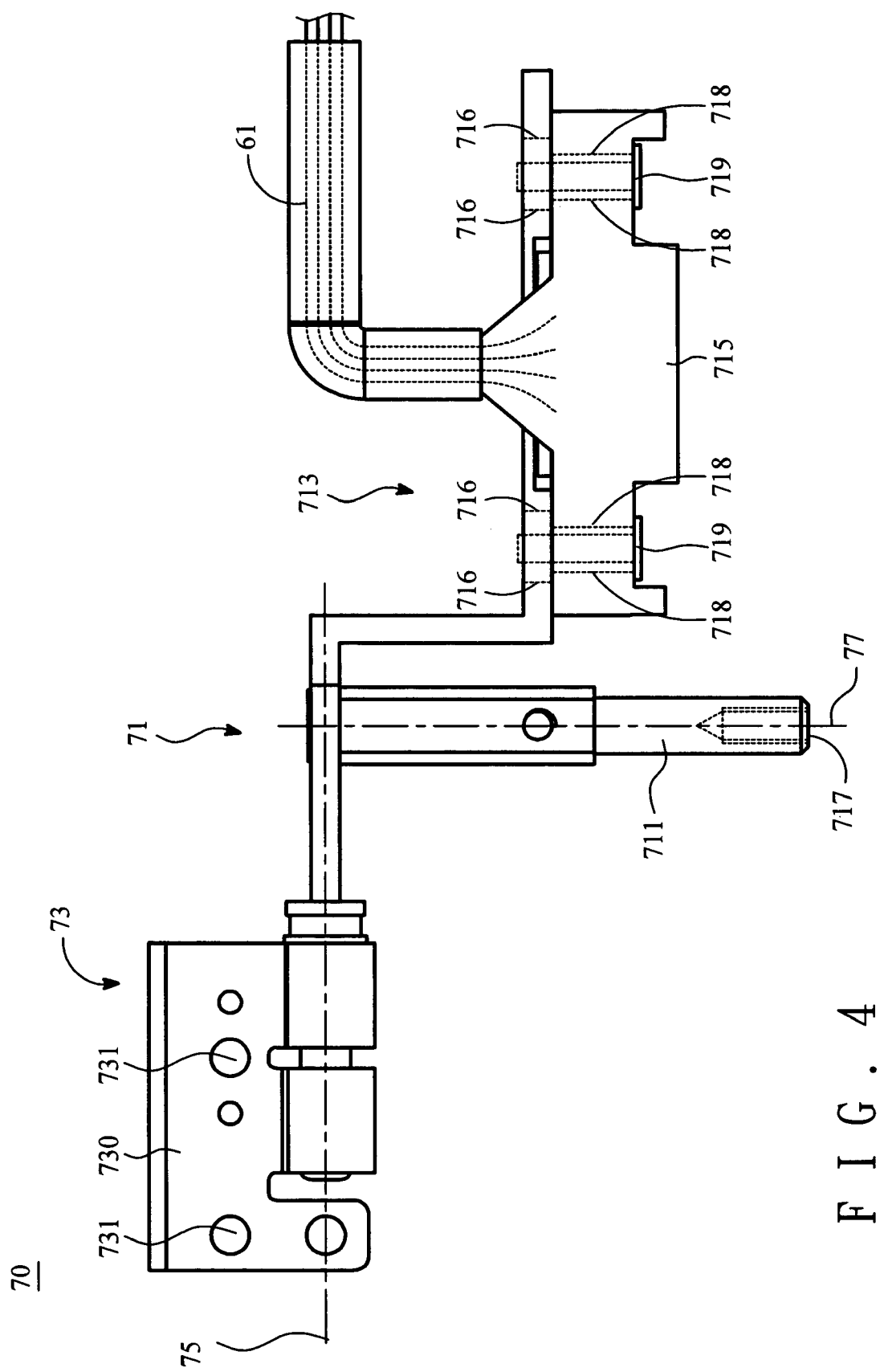
FIG. 4 is a front view of another embodiment of the hinge of the invention.

Refer to FIG. 4 for another preferred embodiment. The first hinge piece 71 further includes a second connector 715 which has at least an eighth hole 718 to receive a sixth screw 719 to engage with sixth hole 716 to fasten the second connector 715 to the extension portion 713. The second body 60 has a wire set 61 (including signal cable and power cord) passing around the hinge 70 and fastened to the second connector 715.

Figure 5:
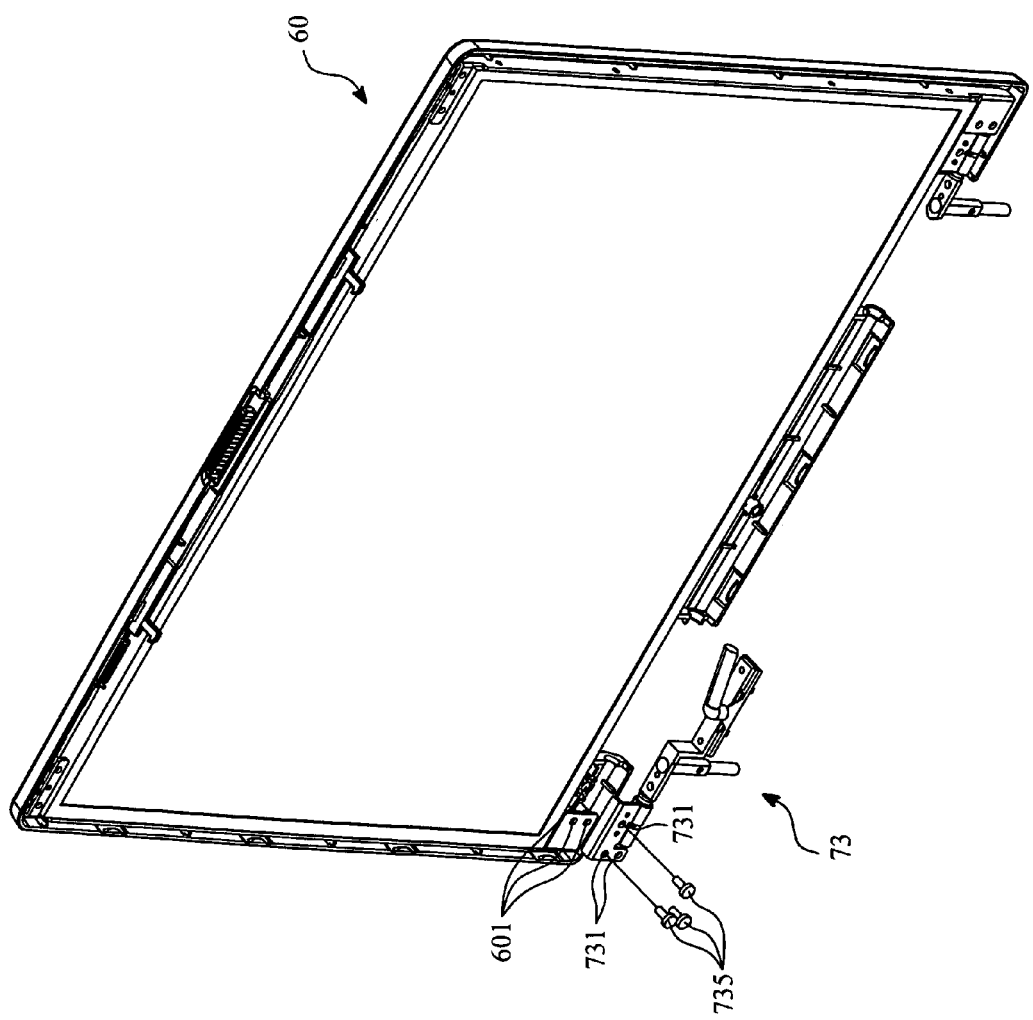
FIG. 5 is a pictorial view of the hinge of the invention fastened to the second body.

As shown in FIG. 5, the second body 60 has at least a fourth hole 601 to receive at least a second screw 735 to engage with the second and fourth holes 731 and 601 to fasten the second hinge piece 73 to the second body 60.

Figure 6:
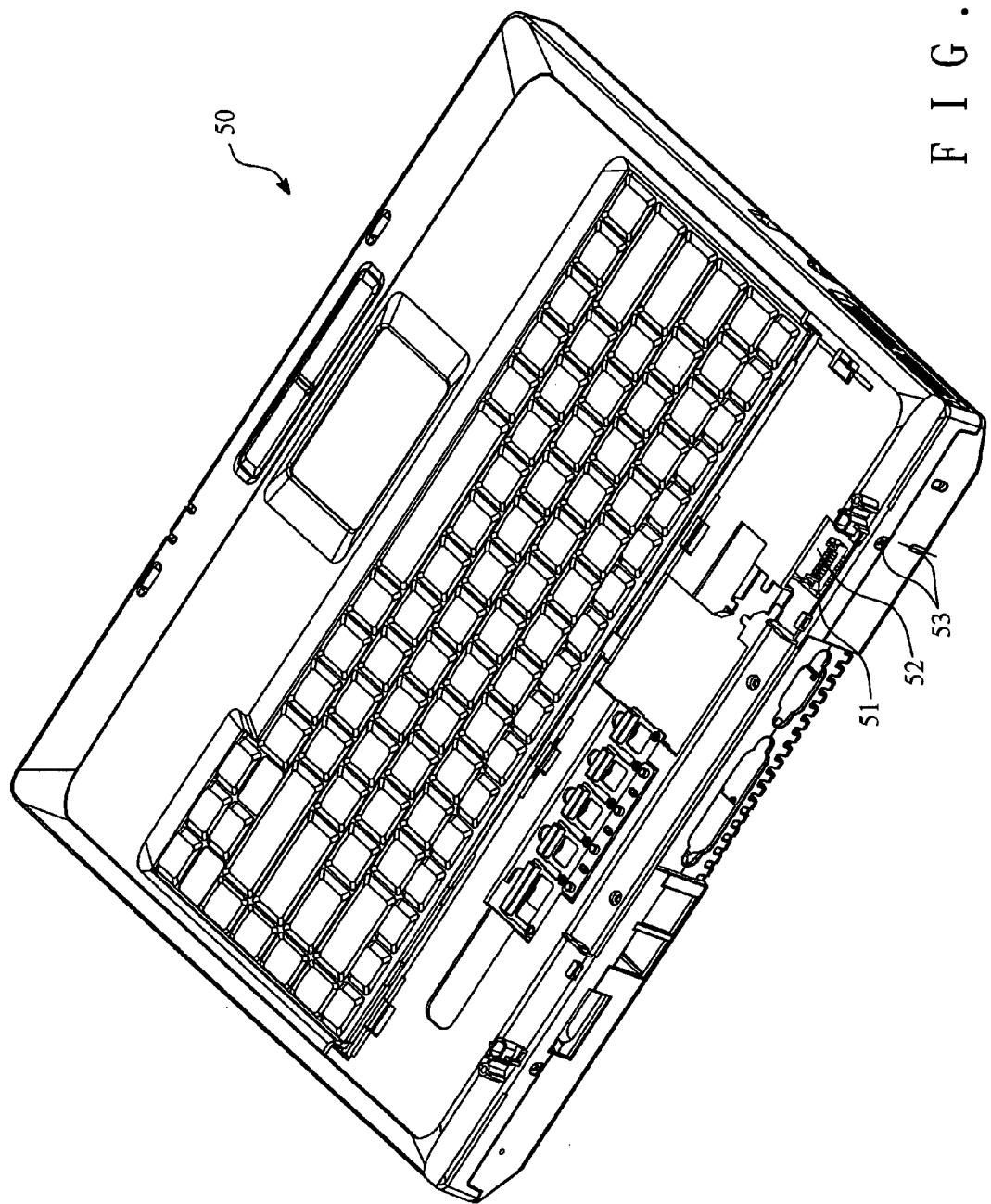
FIG. 6 is a schematic view of the first body according to the invention.
Figure 7:
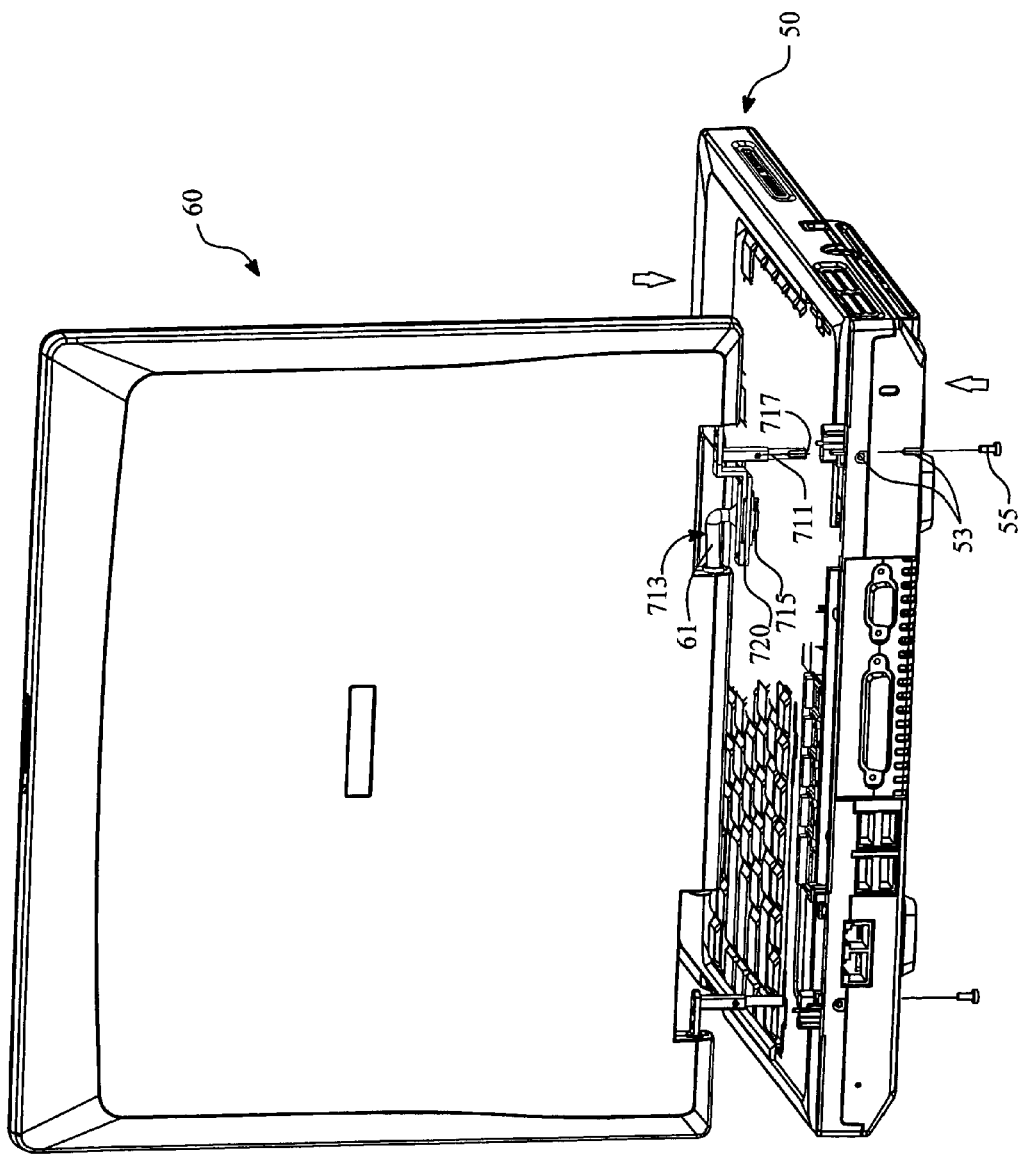
FIG. 7 is a schematic view of the invention during assembly.

Referring to FIGS. 6 and 7, the first body 50 includes a recess 52, a third hole 53 and a first connector 51 located in the recess 52. The recess 52 also houses the extension portion 713 of the first hinge piece 71 and the first fastening portion 711.

As shown in FIG. 7, at least one first fixing screw 55 is provided to engage with the first and third holes 717 and 53 to fasten the first fastening portion 711 to the first body 50. Meanwhile, the second connector 715 of the extension portion 713 is electrically coupled with the first connector 51 to transmit communication signals and electric power between the first body 50 and the second body 60.

By means of the construction set for the above, the hinge 70 enables the first body 50 turning relative to the second body 60. In addition, through electrical connection between the second connector 715 and the first connector 51, the first body 50 and the second body 60 may establish electric connection.

Figure 8:
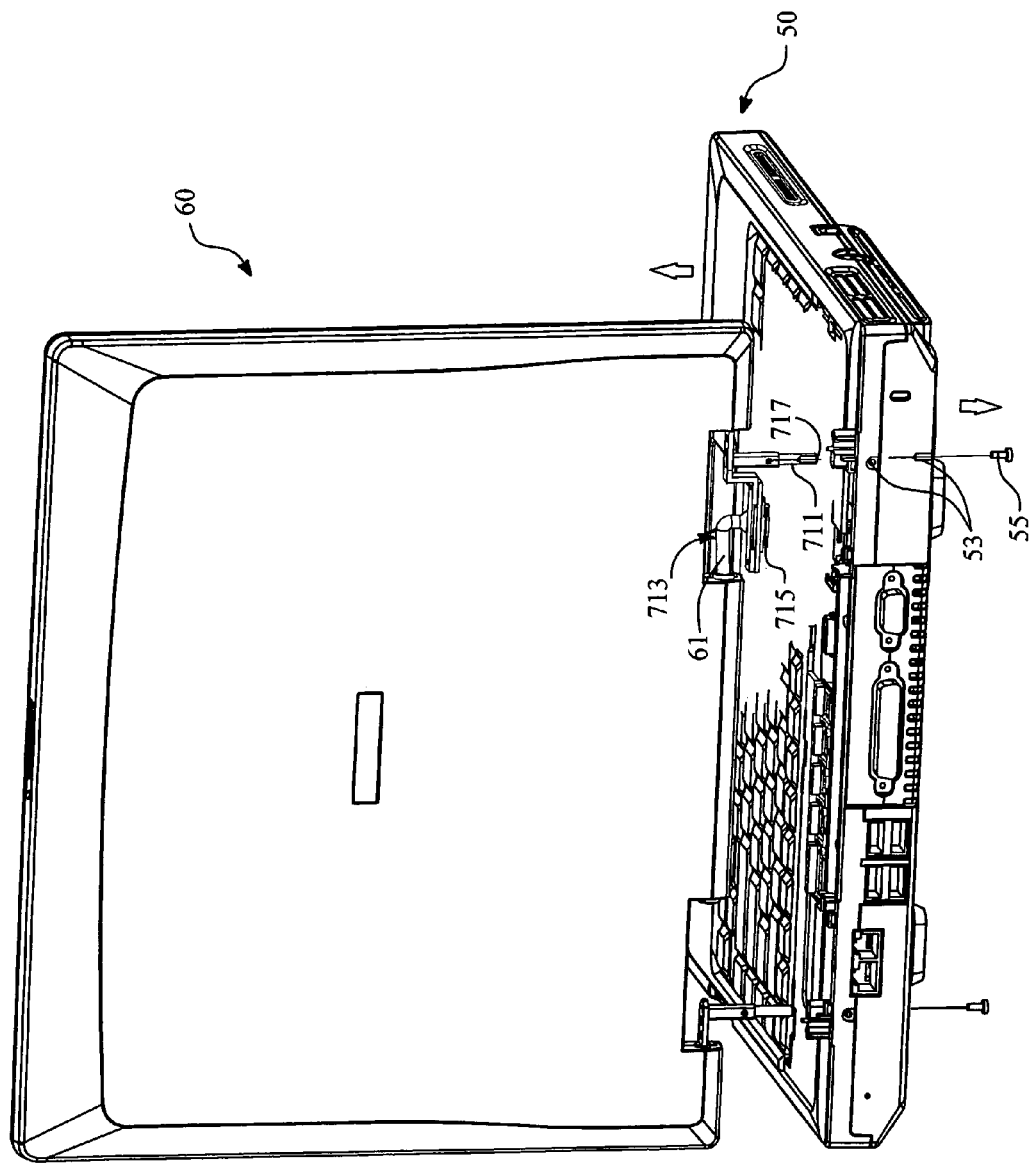
FIG. 8 is a schematic view of the invention during disassembly.

Referring to FIG. 8, for disassembling the electronic device, unfasten at least one first fixing screw 55, the second body 60 and the hinge 70 may be separated from the first body 50, and the first connector 51 is separated from the second connector 715 to become non-conductive.

In summary, the electronic device according to the invention has the following advantages:

With the second connector 715 mounted on the hinge 70, by unfastening at least one first fixing screw 55 the first body 50 may be separated from the second body 60. Thus disassembly time may be reduced to facilitate repairs and inspection for the technicians or users.

For assembling the electronic device 40, the wire set 61 (including signal cable and power cord) of the second body 60 does not have to pass around the hinge and the recess 52 of the first body 50 to connect to the first connector 51 as the conventional device does. According to the invention, the wire set 61 (including signal cable and power cord) of the second body 60 may be connected to the second connector 715 of the extension portion 713. Thus tending of the wire set 61 is easier and assembly time may be reduced.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A hinge located in an electronic device which includes a first body and a second body, the first body having a first connector, the hinge comprising:
   a first hinge piece fastened to the first body;
   a second hinge piece fastened to the second body and pivotally coupled to the first hinge piece; and
   a second connector fastened to the first hinge piece and electrically connecting to the second body and the first connector individually.

2. The hinge of claim 1, wherein the first hinge piece further includes a first fastening portion fixedly located on the first body.

3. The hinge of claim 2, wherein the first fastening portion further includes a first hole, and the first body further includes a third hole, a first fixing screw through the first hole and the third hole to fasten the first hinge piece to the first body.

4. The hinge of claim 3, wherein the second hinge piece is pivotally coupled to said first hinge piece by a pivot axis of the hinge, the first fastening portion having a protusion which axial direction is normal to the pivot axis, the first hole being located in the protusion.

5. The hinge of claim 2, wherein the first hinge piece further comprises an extension portion extending from the first fastening portion, the second connector being fastened to the extension portion.

6. The hinge of claim 5, wherein the extension portion has at least one sixth hole, and the second connector having at least one eighth hole, a sixth screw through the sixth hole and the eighth hole to fasten the second connector to the extension portion.

7. The hinge of claim 5, wherein the second hinge piece is pivotally coupled to the first hinge piece by a pivot axis, the extension portion extending substantially along the pivot axis.

8. The hinge of claim 1, wherein the second hinge piece further includes a second fastening portion fixedly located on the second body.

9. The hinge of claim 8, wherein the second fastening portion has a second hole and the second body has a fourth hole, a second screw fixing through the second hole and the fourth hole to fasten the second hinge piece to the second body.

10. The hinge of claim 1 further comprises a connection plate fastened to the first hinge piece, the second connector being fastened to the connection plate.

11. The hinge of claim 10, wherein the first hinge piece further comprises an extension portion extending from the first fastening portion, the connection plate being fastened to the extension portion.

12. The hinge of claim 11, wherein the connection plate further has a fifth hole, the extension portion having a sixth hole, a fifth fixing screw through the sixth hole and the fifth hole to fasten the connection plate to the extension portion.

13. The hinge of claim 10 further comprises a transmission line electrically connecting to the second connector and the second body and having one end connecting to the connection plate by soldering.

14. The hinge of claim 1 further comprises a transmission line coupling to the second connector to establish electric connection with the second connector and the second body.

15. The hinge of claim 1, wherein the first body further comprises a casing and a circuit board located in the casing, the first connector being mounted onto the circuit board.

* * * * *